(12) United States Patent
Ishikawa et al.

(10) Patent No.: US 6,765,707 B2
(45) Date of Patent: Jul. 20, 2004

(54) VARIABLE SLIT WIDTH DEVICE FOR SPECTROSCOPE

(75) Inventors: Eiji Ishikawa, Tokyo (JP); Hiroshi Ando, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/122,627

(22) Filed: Apr. 15, 2002

(65) Prior Publication Data

US 2002/0149767 A1 Oct. 17, 2002

(30) Foreign Application Priority Data

Apr. 16, 2001 (JP) ........................................ 2001-116452

(51) Int. Cl.⁷ ................................................. G01J 3/04
(52) U.S. Cl. ........................ 359/232; 356/300; 356/332
(58) Field of Search ............................... 356/300, 305, 356/326, 328, 331, 332, 333, 334; 359/232

(56) References Cited

U.S. PATENT DOCUMENTS 5,661,589 A * 8/1997 Meyer ......................... 359/232

* cited by examiner

Primary Examiner—F. L. Evans
(74) Attorney, Agent, or Firm—Flynn, Thiel, Boutell & Tanis, P.C.

(57) ABSTRACT

A variable slit width device for a spectroscope which can be used in a narrow space, be widely variable, and be set in slit width with high accuracy. The variable slit width device includes a pair of freely rotatable rotary parts for pressing inclined guide parts of a pair of slit holders, pressing parts for supporting the pair of rotary parts, and linear guides having guide parts formed at the lower surfaces thereof and extending horizontally in a direction crossing with guide rails at right angles. The pressing parts are fixed to the linear guides, the guide rails are fitted to the guide parts of the linear guides, feed nuts are fixed to the pressing parts, feed screws are engaged with the feed nuts. Bearings are provided for rotatably supporting the feed screws, preload springs for preloading the feed nuts and the feed screws, a slit driving part for rotatably driving the feed screws, and a housing part for fixing thereto the guide rails, the bearings and the motor.

15 Claims, 4 Drawing Sheets

VARIABLE SLIT WIDTH DEVICE FOR SPECTROSCOPE

BACKGROUND OF THE INVENTION

1. Field of the Invention

The invention relates to a variable slit width device to be applied to a spectroscope, particularly to an optical spectrum analyzer.

2. Related Art

A conventional variable slit width device for a spectroscope is now described with reference to FIGS. 4(A), 4(B), 4(C), and FIG. 5. In FIGS. 4(A), 4(B), and 4(C), depicted by 1 is a fixed part of the variable slit width device for a spectroscope. The fixed part 1 is fixed to such as an dispersible monochromator optical spectrum analyzer and other optical devices. A housing part 8 is fixed to the fixed part 1. The housing part 8 houses therein a slit part and a driving part for driving slits so as to open or close the slit part.

The slit part is now described. In FIGS. 4(A), 4(B), 4(C), depicted by 2 are slit defining members, which are parallel with two opposite surfaces of the housing part 8, and disposed in parallel with each other in a horizontal direction. Depicted by 24 is a blade face 24 of the slit defining members 2 which are parallel with two opposite faces of the housing part 8. 25 is also a blade face of the slit defining members 2 which is also disposed in the same manner as the blade face 24 but inclined relative to the two opposite faces of the housing part 8 by an angle of θ.

The slit defining members 2 are fixed to upper surfaces of a pair of slit holders 21. A pair of linear guides 3 (FIG. 5) having guide parts extending horizontally to the right and left are fixed to the upper and lower portions of the slit holders 21.

Referring to FIG. 5, a pair of guide shafts 37 engaging with the guide parts of the pair of linear guides 3 are perpendicularly fixed to two opposite surfaces of the housing part 8. As shown in FIG. 4(A), a switch 26 is provided for detecting open and close ends of the slit defining members 2, and a detection piece which is detected by the switch 26 is fixed to one of the slit holders 21.

A driving part for controlling and driving the slit part so as to close or open the slit part as set forth above will now be described. A pair of feed nuts 6 are disposed at the center between the pair of slit holders 21. The pair of the feed nuts 6 are respectively screwed on a closing screw 64. The closing screw 64 is fixedly attached to a single common shaft 65. The common shaft 65 is rotatably supported by bearings 66 fixed to the two opposite surfaces of the housing part 8.

Both the feed nuts 6 and the closing screw 64 are threaded respectively such that the feed nuts 6 are moved toward each other by the closing screw 64 when the common shaft 65 is rotated in one direction while the feed nuts 6 are moved away from each other by the closing screw 64 when the common shaft 65 is rotated in the other direction. Preload springs 63 are disposed between the two opposite surfaces of the housing part 8 and the feed nuts 6 for preloading the feed nuts 6 in a direction toward one another. The common shaft 65 is connected to the motor 7 via a coupling, and is driven by the motor 7.

With the variable slit width device for a spectroscope of the invention, the closing screw 64 fixed to the common shaft 65 is rotatably driven when the common shaft 65 is rotatably driven by the motor 7 via the coupling. When the closing screw 64 is rotated, the pair of slit holders 21 to which the feed nuts 6 threaded with the closing screw 64 are fixed are driven so as to be moved toward each other or moved away from each other while guided by the linear guides 3 and the pair of guide shafts 37. An interval between the slit defining members 2 is adjusted by adjusting the number of revolutions of the motor 7.

Another conventional variable slit width device for a spectroscope is described next with reference to FIGS. 6 (A), 6(B) and FIG. 7. The prior art in FIGS. 6 (A) and 6(B) relate to a slit width switching device for a spectroscope for selectively using slits from multiple fixed width slits depending on use conditions. A housing part a comprises a fixed part 1, a pair of flat plates 11 which are fixed perpendicularly to the fixed part 1 and disposed in parallel with each other, and a support rod 12. The housing part 8 houses therein slit parts set forth hereunder.

A shaft 9 is disposed on the pair of flat plates 11, and the shaft 9 is supported by bearings 91. A gear 92 is non-rotatably fixed to the shaft 9, and a thin circular plate 93 is positioned axially on the gear 92. A plurality of slits 2 having different widths are formed in the plane surface of the circular plate 93 on the same radius and regular angular intervals. A part of the gear 92 and a part of the circular plate 93 are arranged to protrude from the housing part 8.

The motor 7 is arranged in parallel with the shaft 9 and fixed to one of the flat plates 11, and a gear 92A meshing with the gear 92 is fixed to one shaft of the motor 7, while one revolution detection piece 74 which is detected by a switch 73 is fixed to the other shaft of the motor 7.

However, there was a problem in the variable slit width device for a spectroscope shown in FIG. 4 that it has not been used in a narrow space such as an optical path returning part such as a 2 path, 4 path, 8 path monochromator serving as an optical unit of the dispersible monochromator spectrum analyzer.

That is, even if the slits 2 are positioned in a narrow space such as an optical path returning part such as a 2 path, 4 path, 8 path monochromator, the entire variable slit width device for a spectroscope including the housing part 8 has to be carried in such a narrow space, which is however not practical. Further, there is another problem that the slit defining members 2 do not uniformly operate right and left, a width dimension and the central position in the width direction do not become in theoretical values owing to a manufacturing error of the right and left screws of the closing screw 64, thereby causing error.

Further, in the variable slit width device for a spectroscope as illustrated in FIGS. 6(A) and 6(B), the slits 2, which are formed in the circular plate 93 by disposing a part of the gear 92 and a part of the circular plate 93 so as to protrude from the housing part 8, can be used in a narrow space such as an optical path folding part of double path monochromator serving as an optical unit of the dispersible monochromator spectrum analyzer.

Accordingly, it is an object of the invention to provide a variable slit width device for a spectroscope which can be used in a narrow space such as an optical path folding part of a 2 path, 4 path, 8 path monochromator constituting a part of a dispersible monochromator spectrum analyzer, which is large in variable width with high accuracy.

To achieve the above object, the variable slit width device for a spectroscope of the invention comprises a fixed part fixed to an optical device, a pair of slit holders fixed to the fixed part, guide parts provided on the adjacent surfaces of the pair of slit holders and inclined by a given angle, slit defining members attached to the side surfaces of the pair of slit holders, linear guides having the guide parts provided at the lower surfaces thereof and extending vertically, the slit holders being fixed to the linear guides and guide rails being fitted to the guide parts of the linear guides, attachment plates for fixing the guide rails, springs for urging the pair of slit holders so as to be moved toward each other, and exclusive electrodes attached to the respective slit defining members for detecting the zero point of the interval between the slit defining members, the device additionally includes a pair of freely rotatable rotary parts for pressing inclined guide parts of the pair of slit holders, pressing parts for supporting the pair of rotary parts, linear guides having guide parts formed at the lower surfaces thereof and extending horizontally in a direction crossing with the guide rails at right angles, and the pressing parts being fixed to the linear guides, guide rails fitted to the guide parts of the linear guides, feed nuts fixed to the pressing parts, feed screws screwed with the feed nuts, bearings for rotatably supporting the feed screws, preload springs for preloading the feed nuts and the feed screws, a slit driving part for rotatably driving the feed screws, and a housing part for fixing thereto the guide rails, the bearings and the motor.

The variable slit width device for a spectroscope of the second aspect of the invention is characterized in that the slit defining members protrude from the slit holders and the slit driving part, the guide parts provided in the pair of slit holders are symmetrical with each other, and the slit defining members are inclined by an angle of $\theta$ relative to a moving direction thereof when driven.

PREFERRED EMBODIMENT OF THE INVENTION

Figure 1:
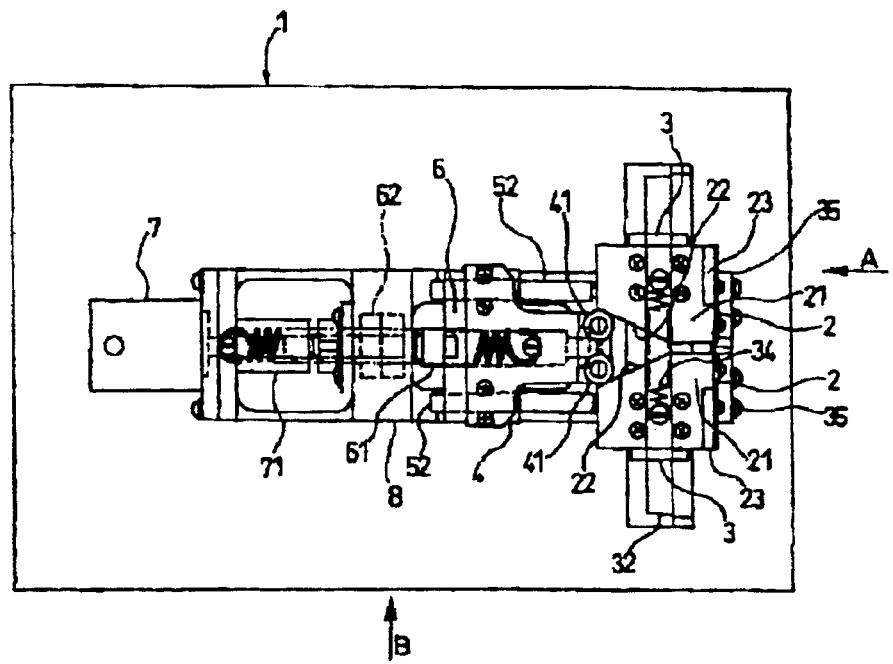
FIG. 1 is a view showing a variable slit width device for a spectroscope according to the invention.
Figure 2:
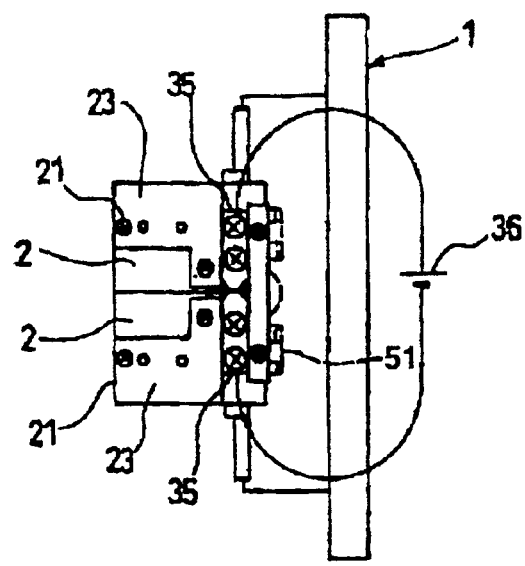
FIG. 2 is a view as viewed from the arrow A in FIG. 1.
Figure 3:
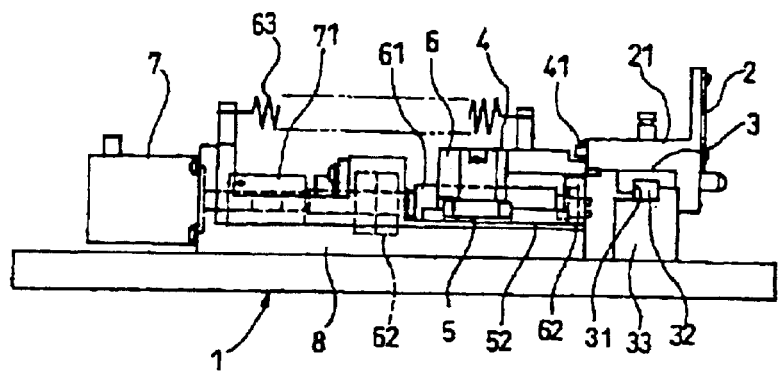
FIG. 3 is a view as viewed from the arrow B in FIG. 1.
Figure 4A:
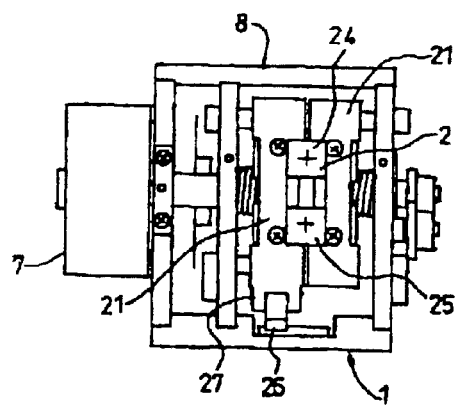
FIGS. 4(A), 4(B) and 4(C) are views showing a conventional variable slit width device for a spectroscope.
Figure 4B:
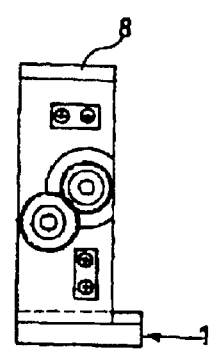
Figure 4C:
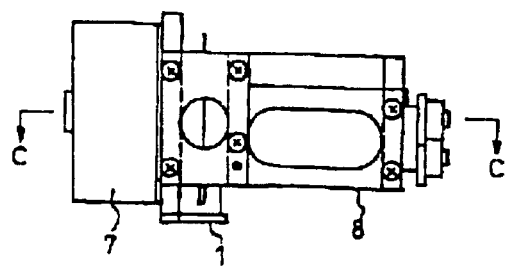
Figure 5:
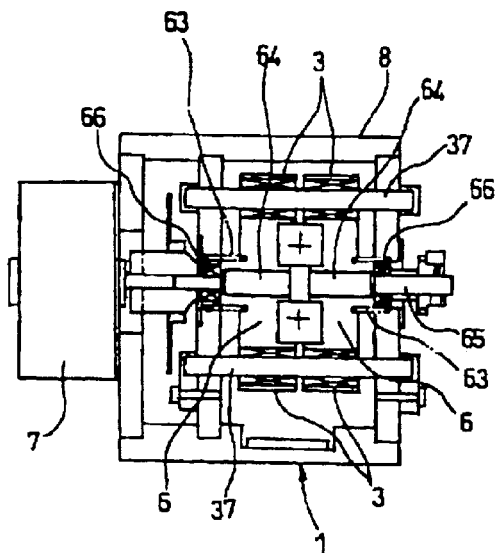
FIG. 5 is a sectional view taken along the line C—C in FIG. 4(C).
Figure 6A:
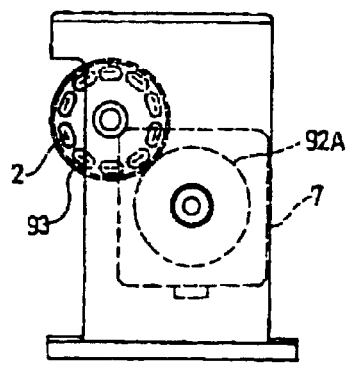
FIGS. 6 (A) and 6(B) are views showing another conventional variable slit width device for a spectroscope.
Figure 6B:
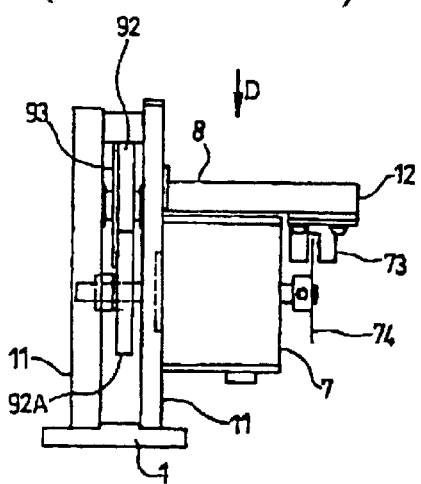
Figure 7:
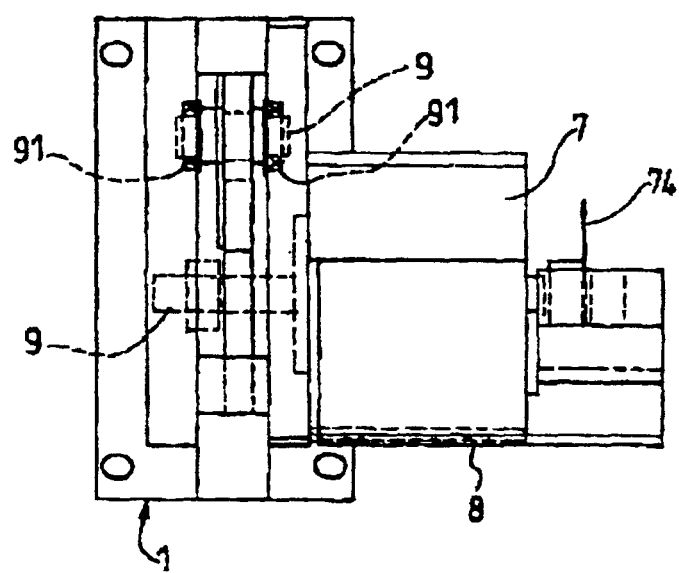
FIG. 7 is a view as viewed from D in FIG. 6(B).

A variable slit width device for a spectroscope of the invention is now described with reference to the attached drawings. FIG. 1 is a view showing a variable slit width device for a spectroscope according to the invention, FIG. 2 is a view as viewed from the arrow A in FIG. 1 and FIG. 3 is a view as viewed from the arrow B in FIG. 1.

As shown in FIG. 1, the variable slit width device for a spectroscope has a fixed part 1. The fixed part 1 is fixed to a dispersible monochromator spectrum analyzer and other optical units requiring a slit part and a driving part for controlling and driving the slit defining members of the slit part so as to open or close the slit part, as described below.

The slit part is described next. Slit defining members 2 are disposed on the side surfaces of a pair of slit holders 21 so as to protrude relative to the slit part and slit driving part by slit pressers 23, as also shown in FIG. 2. A pair of electrodes 35 are attached to the side surfaces of the pair of slit holders 21 under the lower portions of the slit defining members 2 and they are connected to signal power supply 36 by lead wires.

In the illustrated state, the pair of electrodes 35 contact each other and the slit defining members 2 are positioned in an initial interval. Guide surfaces 22 are formed on the opposite surfaces of the pair of slit holders 21 which are inclined by an angle of relative to the moving direction of the slit holders 21 when they are driven. The guide surfaces 22 are symmetrical with each other.

A pair of linear guides 3 are provided on the lower surfaces of the pair of slit holders 21 as shown in FIG. 3. Vertically extending guide parts 31 are formed on the lower surfaces of the linear guides 3. The linear guides 3 are fitted to guide rails 32 fixed to the attachment part 33 and the linear guides 3 are guided and slid by the guide rails 32. Springs 34 are attached to the upper surfaces of the slit holders 21 to bias the slit holders 21 toward each other as shown in FIG. 1.

The slit driving part for controlling and driving the slit part so as to open or close the slit part is now described. As shown in FIG. 1, a pair of guide rails 52 are fixed to the housing part 8 in a direction crossing with the guide rails 32 at right angles. As shown in FIG. 3, linear guides 5 each having guide parts 51 (FIG. 2) fitted to the guide rails 52 and extending horizontally to the right and left are fixed to the lower surface of the pressing parts 4. A pair of rotary sections 41 are rotatably supported on pressing parts 4 at the tip end of the upper surfaces thereof as shown in FIG. 1. Feed rollers are attached to the pressing parts 4.

The feed screws 61, which are screwed with the feed nuts 6, are rotatably supported by the bearings 62, which are fixed to the housing part 8. The feed screws 61 are connected to the motor 7 via the couplings 71. Preload springs 63 are attached to the variable slit width de-vice so as to prevent backlash between the feed nuts 6 and the feed screws 61.

In the state shown in the embodiment of the invention, the electrodes 35 contact each other while the slit defining members 2 are positioned at an initial interval. Further, the pair of rotary sections 41 contact the guide surfaces 22 of the pair of slit holders 21. From this state, if the motor 7 is driven to rotate in one direction, the feed screws 61 are rotated via the couplings 71, so that the slit holders 21 are expanded uniformly in opposite directions via the feed nuts 6, the pressing parts 4, the rotary sections 41 so that the interval between the slit defining members 2 is increased. From this state, if the motor 7 is driven to rotate in the other direction, the slit holders 21 are moved uniformly toward each other so that the interval therebetween is narrowed so that the interval between the slit defining members 2 is decreased. The interval between the slit defining members 2 can be appropriately set by adjusting the number of revolutions of the motor 7.

The invention is not limited to the foregoing preferred embodiment but can be modified or improved appropriately. For example, materials, shapes, dimensions, configurations, numbers, the disposing locations of the fixed part, the slit holders, the guide parts, the slits, the linear guides, the guide rails, the fixed plate, the springs, the electrodes, the rotary parts, the presser parts, the feed nuts, the feed screws, the preload springs, the slit driving part, the housing parts and the like can be arbitrarily and not limited to those set forth in the preferred embodiment determined if they can achieve the object of the invention.

According to the variable slit width device for a spectroscope of the invention, since the slit defining members are disposed to protrude from the slit part and the slit driving part, only the slit defining members can be separately provided from other members constituting the variable slit width device for a spectroscope so that the slit defining members can be easily applied to the narrow space.

Further, if the guide surfaces of the slit holders are formed long, a distance or interval between the pair of rotary parts can be larger, and if the guide rails are made longer, then the variable width of the interval between the slits can be set larger.

Still further, the slit defining members are held by the preloaded linear guides, and hence no slip occurs even if the electrodes contact each other, and the reproducibility of the initial interval is excellent. Further, even if the manufacturing error relating to the feed screws occurs, the width dimensions of the slits can be set with high accuracy by driving the motor so as to correct the width dimensions of the slits.

Yet, since the guide surfaces of the pair of slit holders are symmetrical with each other, they can be easily machined to have a symmetrical shape by machining the pair of slit holders at the same time, and hence the central position of the slits in the width direction are not changed.

What is claimed is:

1. A variable slit width device for a spectroscope comprising a fixed part fixed to an optical device, a pair of slit holders fixed to the fixed part, guide parts provided on adjacent surfaces of the pair of slit holders and inclined by a given angle, slit defining members attached to side surfaces of the pair of slit holders, first linear guides having guide elements provided at lower surfaces thereof and extending vertically, the slit holders being fixed to the first linear guides and first guide rails being fitted to the guide elements of the first linear guides, attachment plates for fixing the first guide rails, springs for urging the pair of slit holders in a direction toward one another, and exclusive electrodes attached to the respective slit defining members for detecting a zero point of an interval between the slit defining members, said variable slit width device further comprising:

a pair of freely rotatable rotary parts for pressing the inclined guide parts of the pair of slit holders;

pressing parts for supporting the pair of rotary parts;

second linear guides having guide elements formed at lower surfaces thereof and extending horizontally in a direction crossing with the first guide rails at right angles, the pressing parts being fixed to the second linear guides;

second guide rails fitted to the guide elements of the second linear guides;

feed nuts fixed to the pressing parts;

feed screws screwed with the feed nuts;

bearings for rotatably supporting the feed screws;

preload springs for preloading the feed nuts and the feed screws;

a driving device for rotatably driving the feed screws; and a housing part for fixing thereto the second guide rails, the bearings and the driving device.

2. The variable slit width device for a spectroscope according to claim 1, wherein the slit defining members protrude from the slit holders and the second guide rails.

3. The variable slit width device for a spectroscope according to claim 1, wherein the guide parts provided in the pair of slit holders are symmetrical with each other.

4. The variable slit width device for a spectroscope according to claim 1, wherein the guide parts of the respective slit holders are inclined by an angle of θ relative to a moving direction thereof when driven.

5. The variable slit width device for a spectroscope according to claim 1, wherein said feed screws are connected to said driving device via a coupling.

6. The variable slit width device for a spectroscope according to claim 1, wherein said preload springs are disposed to prevent backlash between said feed nuts and said feed screws.

7. The variable slit width device for a spectroscope according to claim 1, wherein said driving device comprises a motor, and when said driving device rotates in a first direction, the interval between said slit defining members is increased, and when said driving device rotates in an opposite direction, the interval between said slit defining members is decreased.

8. The variable slit width device for a spectroscope according to claim 1, wherein said electrodes are attached to side surfaces of the respective slit holders under lower portions of said slit defining members, said electrodes being connected to a signal power supply by lead wires.

9. The variable slit width device for a spectroscope according to claim 1, wherein said electrodes are disposed in contacting relation with one another when said slit defining members are positioned at a predetermined initial interval relative to one another.

10. A variable slit width device for a spectroscope comprising:

a mounting part for securing said device to an optical apparatus;

a pair of slidably movable holding elements secured to said mounting part, said holding elements defining respective guide surfaces thereon which are inclined relative to one another, said holding elements mounting respective slit defining members thereon;

a first pair of linear guides fixed to the respective holding elements, said first linear guides having respective lower surfaces defining thereon respective generally vertically oriented first guide parts;

a first guide rail fixed to said mounting part, said first guide parts of the respective first linear guides being slidably engaged with said first guide rail to permit movement of said holding elements and the respective slit defining members relative to one another;

a spring disposed to bias the respective holding elements in a direction towards one another;

a pair of electrodes attached to the respective slit defining members for detecting a zero position of said slit defining members relative to one another;

a slidably movable pressing member mounting thereon a pair of freely rotatable members disposed to press against the respective guide surfaces of said holding elements, said pressing member mounting thereon a feed nut;

a pair of second linear guides fixed to said pressing member, said second linear guides having respective lower surfaces defining thereon respective second guide parts;

a second pair of guide rails fixed to said mounting part, said second guide parts of said second linear guides being slidably engaged with the respective second guide rails, said second guide rails and said second linear guides being disposed generally perpendicularly relative to said first guide rail and said first linear guides;

a feed screw supported for rotation by a bearing and engaged with said feed nut of said pressing member, and a spring disposed to preload said feed nut and said feed screw; and a motor for rotatably driving said feed screw and moving said pressing member relative to said holding members to selectively adjust a distance between said slit defining members.

11. The variable slit width device of claim 10, wherein said guide surfaces defined on the respective holding elements are disposed in opposed face-to-face relation with one another and together define a V-shape when viewed from above such that when said pressing member is advanced towards said holding elements upon rotation of said feed screw in a first direction, said rotatable members bear against the respective guide surfaces and cause movement of said slit defining members away from one another against the force of said spring to increase the distance between said slit defining members, and when said pressing member is moved away from said holding elements upon rotation of said feed screw in a second direction opposite to said first direction, said spring urges said slit defining members towards one another to decrease the distance therebetween.

12. The variable slit width device of claim 10, wherein said motor and said feed screw are drivingly connected to one another via a coupling.

13. The variable slit width device of claim 10, wherein said preload spring is disposed to prevent backlash between said feed nut and said feed screw.

14. The variable slit width device of claim 10, wherein said electrodes are attached to side surfaces of the respective holding elements under lower portions of said slit defining members, said electrodes being connected to a signal power supply by a lead wire.

15. The variable slit width device of claim 10, wherein said electrodes are disposed in contacting relation with one another when said slit defining members are positioned at the zero position relative to one another.

* * * * *